US012636866B2

(12) United States Patent
Baert et al.

(10) Patent No.: US 12,636,866 B2
(45) Date of Patent: May 26, 2026

(54) DECORATIVE PANEL AND PROCESS FOR PRODUCING A PANEL

(71) Applicant: CFL Holding Limited, Hong Kong (HK)

(72) Inventors: Thomas Luc Martine Baert, Sint-Martens-Latem (BE); Tom Van Poyer, Jiaxing (CN); Sven Boon, Jiaxing (CN)

(73) Assignee: CFL Holding Limited, Hong Kong (HK)

( * ) Notice: Subject to any disclaimer, the term of this patent is extended or adjusted under 35 U.S.C. 154(b) by 0 days.

(21) Appl. No.: 18/920,244

(22) Filed: Oct. 18, 2024

(65) Prior Publication Data

US 2025/0128503 A1 Apr. 24, 2025

(30) Foreign Application Priority Data

Oct. 19, 2023 (NL) ..................................... 2036078

(51) Int. Cl.
| | |
|---|---|
| *B32B 3/10* | (2006.01) |
| *B32B 7/022* | (2019.01) |
| *B32B 27/08* | (2006.01) |
| *B32B 27/20* | (2006.01) |
| *B32B 27/32* | (2006.01) |

(52) U.S. Cl.
CPC .............. *B32B 27/20* (2013.01); *B32B 7/022* (2019.01); *B32B 27/08* (2013.01); *B32B 27/32* (2013.01); *B32B 2262/10* (2013.01); *B32B*

*2307/536* (2013.01); *B32B 2307/704* (2013.01); *B32B 2307/72* (2013.01); *B32B 2607/00* (2013.01)

(58) Field of Classification Search
None
See application file for complete search history.

(56) References Cited

U.S. PATENT DOCUMENTS

| | | | | |
|---|---|---|---|---|
| 2018/0283014 A1* | 10/2018 | Hodgkins | .............. | E04F 15/105 |
| 2018/0304601 A1* | 10/2018 | Song | .................... | B32B 9/06 |
| 2023/0304298 A1 | 9/2023 | Baert et al. | | |

FOREIGN PATENT DOCUMENTS

| | | | |
|---|---|---|---|
| WO | 2013036989 A1 | 3/2023 | |

* cited by examiner

*Primary Examiner* — Christopher M Polley
(74) *Attorney, Agent, or Firm* — Heslin Rothenberg Farley & Mesiti P.C.

(57) ABSTRACT

The invention relates to a decorative panel, in particular a floor, ceiling, building or wall panel, and a process and extrusion line for producing such decorative panel. The panel comprises at least one core layer and at least one decorative top layer, wherein at least one core layer comprises at least one structural core component and at least one balancing core component, wherein at least one structural core component comprises at least one mineral filler and at least one first polymeric composition and wherein at least one balancing core component comprises at least one second polymeric composition.

19 Claims, 3 Drawing Sheets

DECORATIVE PANEL AND PROCESS FOR PRODUCING A PANEL

CROSS REFERENCE TO RELATED APPLICATION

This application claims priority under 35 U.S.C. § 119 to Netherlands Patent Application No. 2036078, filed Oct. 19, 2023, which is incorporated herein by reference in its entirety.

FIELD OF THE INVENTION

The invention relates to a decorative panel. The invention also relates to a process for producing a decorative panel.

BACKGROUND

Halogenated amorphous thermoplastics such as polyvinyl chloride (PVC) are commonly used for producing decorative resilient floor, ceiling, wall, furniture and/or building panels, for example decorative panels comprising a core and a decorative top layer, due to their beneficial characteristics including balance between rigidity and flexibility, resilience and chemical resistance, as well as ease of processing owing to their wide temperature processing window, low processing temperatures, fast cooling rates, relatively low melt viscosity, and a lack of crystalline residual stresses, which enables that such materials are easily shapable into stable and uniform sheets, such as decorative panels, as well as their inherent characteristics which allow the use of interlocking coupling mechanisms on such panels. The use of halogenated amorphous thermoplastics such as polyvinyl chloride (PVC) in building materials however is a subject of ongoing debate due to environmental and health concerns. Some of the key concerns associated with the use of PVC in building materials and the components include the environmental impact of their disposal (releasing harmful compounds like dioxins when incinerated), toxic emissions during processing (including halogens such as chloride and fluoride, and hydrogen chloride gas), the use of harmful plasticizers for flexibility (such as phthalate plasticizers), recycling challenges if mixed with other materials and the need for thorough separation prior to recycling and the like. There is therefore an increasing demand to produce decorative (resilient) panels and/or their composite layers such as core layers, carrier layers, decorative top layers, wearing layers and the like with alternative materials which are substantially free of halogens, preferably free of plasticizers, and which are more readily recycled. As an alternative to PVC, semi-crystalline thermoplastic polymers, more specifically semi-crystalline polyolefin polymers, such as polyethylene (PE), polyethylene terephthalate (PET), polybutene-1 (PB-1) and/or polypropylene (PP), are being considered.

However, semi-crystalline thermoplastics can develop residual stresses during cooling and solidification due to the formation of a crystalline structure, causing warping and bending of the panel during production and in use, and may prove too brittle for use as a decorative floor, wall and/or ceiling panel when produced according to the state of the art. Moreover, due to their high processing temperature, fast cooling rate, and low viscosity compared to amorphous thermoplastics, difficulties may arise during the manufacturing process of such panels which could result in nonuniform and/or unstable panels.

It is a goal of the invention to provide a decorative panel, a production process and/or an extrusion line which can fulfill at least part of the abovementioned needs and/or at least partially overcome the drawbacks of the current state of art.

The invention provides thereto a decorative panel, in particular a floor, ceiling, building or wall panel, comprising at least one core layer and preferably at least one decorative top layer, wherein at least one core layer comprises at least one structural core component and/or at least one balancing core component, wherein at least one structural core component has a first hardness and/or crystallinity, and wherein at least one balancing core component has a second hardness and/or crystallinity. The second hardness and/or crystallinity is preferably 3-35% higher than a first hardness and/or crystallinity.

The invention provides thereto also a decorative panel, in particular a floor, ceiling, building or wall panel, comprising at least one core layer and preferably at least one decorative top layer, wherein at least one core layer comprises at least one structural core component and/or at least one balancing core component, wherein at least one structural core component comprises at least one mineral filler and at least one first polymeric composition and wherein at least one balancing core component comprises at least one second polymeric composition.

The panel according to the present invention benefits from at least one core layer comprising at least one structural core component and at least one balancing core component since the combination of at least one structural core component and at least one balancing core component wherein at least one structural core component has a first hardness and/or crystallinity, and wherein at least one balancing core component has a second hardness and/or crystallinity, wherein a second hardness and/or crystallinity is preferably 3-35% higher than a first hardness and/or crystallinity and/or at least one structural core component which comprises at least one mineral filler and at least one first polymeric composition and at least one balancing core component which comprises at least one second polymeric composition results in a substantially semi-rigid panel which is dimensionally stable. The panel according to the present invention can be made such that said panel is substantially free of halogens and/or plasticizers. Since the core layer comprises at least one structural core component and at least one balancing core component the core layer as such comprises basically an integrated balancing layer. At least one balancing core component basically forms an integrally formed balancing layer within the core layer. In practice, panels typically require additional balancing layers to provide sufficient stability of the panel. The use of an internal and/or integrated balancing layer within the core layer results in a more stable product and thus that additional production steps, such as laminating at least one balancing layer to the core layer, can be omitted. Hence the panel as such and the method of production thereof enjoy considerable benefits.

The panel according to the present invention may in particular be a substantially resilient and/or flexible panel suitable for gluedown installation. It is for example imaginable that at least one core layer has a rigidity below 3,500 Mpa, preferably below 2,000 MPa and/or has a rigidity below 75 mm, more preferably below 50 mm or in the range of 25 to 50 mm when tested via a Mandrel test according to ASTM F137. The panel according to the present invention may in particular be a substantially semi-rigid panel comprising a core layer carrying an interlocking mechanism suitable for a floating installation. It is for example also imaginable that at least one core layer has a rigidity in the range of 1,800 to 10,000 MPa, preferably in the range of 3,500 to 5,500 MPa in particular when measured according to EN 310 or ASTM D790 and/or has a rigidity in the range of 50 to 350 mm when tested via a Mandrel test according to ASTM F137.

When it is referred to a first polymeric composition also a first polymer can be meant. When it is referred to a second polymeric composition also a second polymer can be meant.

At least one core layer of a panel according to the present invention is an extruded core layer. The core layer can be formed via a single extrusion step which enables the formation of a core layer according to the present invention. At least one core layer of a panel may also be a co-extruded core layer, preferably a single manifold co-extruded core layer. At least one core layer is typically made via the co-extrusion of material forming at least one structural core component and material forming at least one balancing core component. It is also imaginable that at least one core layer comprises multiple structural core components and/or multiple balancing core components according to the present invention. An embodiment is imaginable wherein at least one structural core component is substantially enclosed and/or located between at least two balancing core components.

At least one first polymeric composition and/or at least one second polymeric composition preferably comprises at least one semi-crystalline thermoplastic polymer. It is also imaginable that at least one first polymeric composition and/or at least one second polymeric composition comprises or is formed by a semi-crystalline polyolefin and/or a semi-crystalline polymer, in particular a non-halogenic semi-crystalline thermoplastic polymer. The combination of such first polymeric composition and at least one mineral filler was found to be successful as structural core component of the core layer. It is for example possible that at least one first polymeric composition and/or at least one second polymeric composition comprises, or is formed by, polyethylene (PE), polyethylene terephthalate (PET), polybutene-1 (PB-1), polymer environmental resin (PER), polylactic acid (PLA) and/or polypropylene (PP). At least one polymer of at least one first polymeric composition and/or at least one second polymeric composition preferably has a relatively low glass transition temperature, for example a glass transition temperature greater than or equal to −50° C.

At least one structural core component preferably comprises at least 60%, preferably at least 70%, most preferably at least 75% by weight of at least one mineral filler. It is also conceivable that at least one structural core component preferably comprises in the range of 60 to 85 wt %, preferably 70 to 80 wt %, more preferably about 75 wt % of at least one mineral filler. At least one structural core component preferably comprises 5 to 30% by weight, preferably 10 to 20% by weight and more preferably about 15% by weight of at least one first polymeric composition. In a further preferred embodiment, at least one structural core component, and in particular at least one first polymeric composition comprises at least one semi-crystalline thermoplastic polymer and/or at least one plastomeric additive. At least one structural core component may comprise 5 to 30% by weight, preferably 10 to 20% by weight and more preferably about 15% by weight of at least one plastomeric additive, with the remainder of the 5 to 30% by weight, preferably 5 to 15% by weight, most preferably about 10% by weight comprising at least one semi-crystalline polymer. The combination of at least one mineral filler, at least one semi-crystalline thermoplastic polymer and at least one plastomeric additive according to the present invention improves the processability, reduces phase separation and interfacial energy, thereby enhancing interfacial adhesion, melt flow characteristics, adhesion of the polymer phases, reducing aggregation of the mineral component, and improving flexibility, impact resistance and flexibility of the resulting composite material. In short, it improves the overall compatibility and performance of the composition, which leads to reduced thermal expansion and improved dimensional stability as well as enhanced mechanical properties of the core layer and thus of the panel as such. It further enables the resulting composition to be particularly suited to serve as a component, preferably a structural core component, of a decorative building panel such as a decorative floor, wall, building and/or ceiling panel which need to withstand wear and tear for extended periods of time.

In a possible embodiment, at least one structural core component, and in particular at least one first polymeric composition comprises at least one plastomeric additive. It must be noted that within the context of the present invention, a plastomeric additive is not the same as an elastomeric additive. A plastomeric additive combines the characteristics of elastomers and plastics. It is conceivable that at least one plastomeric additive is present in 2 to 30 wt %, preferably 5 to 20 wt %, more preferably about 10 to 15 wt % in at least one structural core component. It is for example that said plastomeric additive is a copolymer of a semi-crystalline thermoplastic polymer and ethylene and/or ethylene units. It is imaginable that said ethylene and/or ethylene units are present in 2 to 30 wt %, preferably 5 to 20 wt %, more preferably about 10 to 15 wt % of said co-polymer. It is surmised that applying a predetermined wt % of ethylene content reduces crystallinity of the resulting mixture, lowers the melting point of the melt and exhibits a more amorphous structure compared to for example pure isotactic semi-crystalline polyolefin such as iPP and/or iBP-1. It is conceivable that said at least one plastomeric additive is manufactured by means of metallocene catalysis and/or a solution process.

At least one mineral filler of at least one structural core component is for example chosen from the group of: limestone, talc, calcium carbonate, magnesium, magnesium oxide, magnesium sulfate, magnesium chloride, kaolin, talc, dolomite, calcite, ferric oxide, magnesium dihydroxide or magnesium dihydrate (MDH), aluminium trihydroxide or aluminium trihydrate (ATH), sand, and combinations thereof. At least one mineral filler is in particular configured to be mixed with the at least one first polymeric composition. The fineness of at least one mineral filler can be in the range of 80-1200 mesh, preferably 200-1000 mesh, more preferably 350-450 mesh or 800-1000 mesh. At such a range of fineness, the mixing uniformity of the mineral filler and the first polymer is significantly increased. The core layer comprises for example 60-85 parts by weight, preferably 70-80 parts by weight, most preferably about 75 parts by weight of a filler. It is also imaginable that at least one structural core component comprises for example 60-85 parts by weight, preferably 70-80 parts by weight, most preferably about 75 parts by weight of a filler. Such amount of filler material is found to significantly control the thermal expansion rate of the first polymeric composition in the composition of the structural core component to at most 0.2% while also ensuring sufficient rigidity and dimensional stability of the panel.

In yet another embodiment, it is conceivable that at least one core layer, and in particular at least one structural core component, can include at least one additional filler selected from the group consisting of steel, glass, wood, acrylic, alumina, curaua, carbon, cellulose, coconut, kevlar, Nylon, perlon, expanded microspheres, PVC, PVA, rock wool, viburnum and fique. The addition of at least one additional filler from aforementioned selection of materials could contribute to the increase in the panel's water resistance and/or fire resistance.

In a possible embodiment, at least one structural core component comprises at least one plastomeric and/or elastomeric additive. In a preferred embodiment, at least one structural core component comprises at least one copolymer of at least one semi-crystalline thermoplastic polymer or a semi-crystalline thermoplastic polyolefin and ethylene. Possibly, said semi-crystalline polyolefin, if applied, is a polyolefin plastomer and/or polyolefin elastomer, more preferably a propylene/ethylene copolymer. Said plastomeric additive has preferably a density of 0.8 to 1 g/cm3, in particular 0.862 to 0.912 g/cm3. It is further conceivable that said at least one plastomeric and/or elastomeric additive comprises at least one elastomeric polyolefin, such as elastomeric polypropylene, comprising isotactic, syndiotactic and/or atactic polyolefin blocks. It is conceivable that said blocks are present in alternating and/or repeat in a regular sequence, imparting to the resulting mixture a higher degree of flexibility and impact resistance compared to a purely isotactic additive. Preferably, at least one structural core component, and in particular at least one first polymeric composition comprises at least one copolymer of propylene and ethylene which more preferably comprises at least one polar functional groups chosen from the group of hydroxyl, ether. and carbonyl. At least one first polymeric composition of at least one structural core component preferably comprises at least one plastomeric and/or elastomeric polyolefin comprising isotactic, syndiotactic and/or atactic polyolefin blocks. It is conceivable that the inclusion of ethylene groups to said plastomeric additive may improve or resolve at least some of the disadvantages of the material, by means of improved adhesion, reduced brittleness, improved processability and modified thermal properties. In a possible embodiment, the ethylene units in at least one first polymeric composition, typified by carbon double bonds C=C, may further be chemically modified to introduce polar functional groups, which may enhance the copolymer's affinity for adhesives and other polar materials. Said polar functional groups may comprise carbonyl (C=O) groups, hydroxyl (OH) groups and/or ether (C—O—C) groups. It is conceivable that these polar groups increase the copolymer's surface energy, allowing for an improved adhesion and lamination strength when combined with other layers, such as a decorative top layer.

The at least one balancing core component preferably has a crystallinity which is higher than the crystallinity of at least one structural core component and/or the at least one balancing core component has a Shore D hardness which is higher than the Shore D hardness of at least one structural core component. It is imaginable that at least one balancing core component has a crystallinity which is 3-35% higher than the crystallinity of at least one structural core component and/or that at least one balancing core component has a Shore D hardness which is 3-35% higher than the Shore D hardness of at least one structural core component. The desired degree of crystallinity and/or Shore D hardness of at least one region of the core layer allows the lamination of an additional layer, for example a decorative top layer thereto can be effectively achieved. In a possible embodiment therefore, the crystallinity gradient of at least one core layer of at least one core component, preferably at least one structural core component is not homogenous throughout the entire volume thereof. This can for example be evidenced by a varying Shore D hardness of the structural core component and the balancing core component. Optionally, the degree of crystallinity at the interior of core layer can be reduced when compared to the degree of crystallinity at the outer surfaces of the polymer sheet. The Shore D hardness of different materials when measured with a durometer is shown below:

| Product | Material | Measurement | Shore D |
|---|---|---|---|
| PVC based core layer | Structural core component | Top surface | 82 |
| | Structural core component | Side/Middle | 82 |
| | Structural core component | Bottom surface | 83 |
| PP based core layer | Balancing core component | Top surface | 70 |
| | Structural core component | Side/Middle | 51 |
| | Balancing core component | Bottom surface | 70 |
| PET based core layer | Structural core component | Top surface | 72 |
| | Structural core component | Side/Middle | 68 |
| | Balancing core component | Bottom surface | 75 |

The Shore D hardness of the at least one structural core component can for example be in the range of 50 to 70. The Shore D hardness of the at least one balancing component can for example be in the range of 70 to 75.

It is deemed that such heterogeneous degree of hardness and/or crystallinity imparts enhanced thermal stability to the core layer and the panel in whole. It has been experimentally found that such heterogeneous degree of crystallinity and/or hardness within the core layer improves the thermal stability of the panel, in particular the thermal contraction rate of the polymer sheet and/or the panel in whole is less than or equal to 0.25% when measured to ISO 23999, and the expansion rate of the core layer and/or the panel in whole is less than or equal to 0.13% when measured to ISO 23999 (heated up to and measured at 60 C). As a result, the panel according to the present invention can retain its structural integrity, mechanical properties and functionality at higher temperatures. In a preferred embodiment therefore, the structure of the core layer may be designed in such a way that facilitates the formation of a crystallinity and/or hardness differences and/or gradients within the core layer. It is possible that the Shore D hardness measured on at least one surface layer of the at least one core layer is 5-10%, preferably 20-40%, most preferably around 30-35% higher than the Shore D hardness measured at the side or in the middle of the core layer. It is therefore conceivable and desirable that the at least one structural core component hardness, specifically Shore D hardness, is lower than the balancing core component.

At least one first polymeric composition and/or at least one second polymeric composition comprises preferably at least one polyolefin. At least one second polymer comprises polyethylene (PE), polyethylene terephthalate (PET), polybutene-1 (PB-1), polymer environmental resin (PER), polylactic acid (PLA) and/or polypropylene (PP). At least one first polymeric composition can differ from at least one second polymeric composition. However, it is also conceivable that at least one first polymeric composition is substantially the same as at least one second polymeric composition. This is beneficial for the ease of recycling of the panel. In a preferred embodiment, at least one first polymeric composition and/or at least one second polymeric composition comprises at least one isotactic polyolefin, preferably isotactic polypropylene. At least one balancing core component could also consist substantially of isotactic polyolefin, for example isotactic polypropylene. Fusion of the at least one structural core component and the at least one balancing core component may be improved if the at least one first polymeric composition is substantially the same as the at least one second polymeric composition.

At least one structural core component can be located at an upper side of at least one core layer an at least one balancing core component is located at a bottom side of at least one core layer. The upper side could also be referred to as first side and/or the bottom side could be referred to as second side. The first side or upper side is preferably near the decorative top layer. The decorative layer can be attached to the upper side of the core layer. The combination of at least one structural core component and at least one balancing core component according to the present invention results in that the core layer as such has beneficial properties in terms of strength and/or rigidity. The core layer according to the present invention can be free of reinforcing layers.

At least one decorative layer can for example comprise at least one semi crystalline polymer, in particular at least one non-halogenic semi-crystalline thermoplastic polymer. In a further possible embodiment, at least one decorative top layer comprises polypropylene, in particular a polypropylene foil. At least one decorative top layer may comprise at least one polypropylene wear layer of at least 0.1 mm in thickness, for example wherein at least a part of said polypropylene wear layer is transparent.

In a preferred embodiment, at least one core layer, and in particular at least one structural core component, comprises 1-5 parts by weight, preferably at most 3 parts by weight, more preferably at most 1.5 parts by weight of a stabilizer comprising at least one compound selected from the group comprising hindered phenols, phenolic stabilizers, phenol-thioester stabilizer, phosphites, phosphonites, thioethers, hydroxylamines, hindered amine light stabilizers (HALS), benzoates, UV absorbers, stearic acid, zinc oxide, magnesium hydroxide, calcium stearate and/or metal oxides. The presence of stabilizer at such range, may improve the melt flow index (MFI) of the core layer's composition by reducing the effect of temperature changes on the physical properties of the modified polypropylene thereby consequently increasing the stability of the composition and the core layer itself. As a result, the physical properties, such as the compressive strength, of the core layer is enhanced to a certain degree. It also reduces the stress concentration of the core layer leading to better impact strength of the panel and reduces the risk of thermal and/or oxidative degradation through the scavenging of free radicals and intermediates such as (hydro) peroxides. It is conceivable that the stabilizer can also comprise material selected from the group consisting of acrylic acid, zinc phosphate and a combination thereof.

In a preferred embodiment, the core layer and in particular at least one structural core component, comprises 1-5 parts by weight, preferably at most 3 parts by weight, more preferably at most 1.5 parts by weight of a coupling agent comprising at least one compound selected from the group comprising titanates, maleic anhydride grafted polypropylene, silanes and epoxidized fatty acid esters. Preferably, the coupling agent is a titanate coupler. It has been found that the addition of titanate coupler at the specified amount substantially strengthens the PP composite, if applied. It substantially improves the compatibility and dispersibility of the composite which enhances the mechanical properties of the composite such as increased tensile strength and young's modulus and improved aging resistance. The presence of at least one coupling agent prevents the inorganic material from agglomerating and thus ensures a homogenous distribution of the inorganic material throughout the composite material. This increases the rigidity, toughness, modulus of elasticity and hardness properties of the panel. The at least one coupling agent can also comprise of at least one organofunctional coupling agent which enables the use of a relatively high inorganic material content. In fact, the content of inorganic material can be increased with respect to conventionally applied composite materials as the organofunctional group enhances the overall properties of composite material. It is conceivable that the coupling agent may comprise silicon, titanium or zirconium. It is also conceivable that the coupling agent is chosen from the group comprising monoalkoxy titanate, titanium triisostearoylisopropoxide, isoprophyl triisostearoyl titanate, distearoyl isopropoxy aluminate, neopentyl(diallyl)oxy tri (dioctyl) pyrophosphate titanate, cyclo [dineopentyl(diallyl)] pyrophosphate dineopentyl(diallyl) zirconate, or combinations and derivatives thereof. In an embodiment, the lubricant, if applied, is selected from the group consisting of zinc fatty acid, polyethylene wax and a combination thereof. These lubricants are all commercially available, and the presence of the lubricant can further increase the mixing uniformity of the components, thereby improving the molding effect of the panel.

In another embodiment, at least one core layer further comprises pigments, modifiers, fibers, such as: glass fiber, wood, straw and/or hemp. The fibers can be loose fibers and/or interconnected fibers to form a woven or nonwoven layer.

In an embodiment, the core layer has a thickness of at least 1 mm. It is for example possible that the thickness of the core layer is between 2 and 10 mm, preferably between 3 mm and 8 mm or between 4 mm and 7 mm. The thickness of at least one structural core component may be higher than the thickness of at least one balancing core component.

In an embodiment, at least one core layer has a surface energy that is at least 35 dynes/cm, more preferably at least 40 dynes/cm, most preferably at least 45 dynes/cm. This surface energy of the core layer is for example achieved by subjecting the core layer to surface modification, say for example through chemical modification, corona treatment, plasma treatment and/or polymer modification. It is also possible to improve the surface energy of the core layer by the addition of plastomeric additive comprising ethylene groups. It is conceivable that the addition of plastomeric additive with ethylene groups is conceived to improve adhesion, reduce brittleness, improve processability and modify thermal properties of the core layer. In one embodiment, the ethylene units in said copolymer, typified by carbon double bonds C=C, may further be chemically modified to introduce polar functional groups, which may enhance the copolymer's affinity for adhesives and other polar materials. Said polar functional groups may comprise carbonyl (C=O) groups, hydroxyl (OH) groups and/or ether (C—O—C) groups. It is conceivable that these polar groups increase the copolymer's surface energy, allowing for an improved adhesion and lamination strength when combined with other layers, such as a decorative top layer. It has been found that at this range of surface energy, effective bonding between the core layer and a top layer (i.e., a polypropylene based top layer) is achieved. This solves the problem with the prior art wherein conflictive substrates, which are usually plastics, cannot be bonded effectively.

In a preferred embodiment according to the invention, at least one decorative top layer can comprise at least one wear layer or protective finish, at least one lacquer layer, and/or at least one décor layer providing a desired visual effect to the final product. In one embodiment, the decorative top layer can further comprise a reinforcing layer. In a preferred embodiment, the decorative top layer comprises at least one substantially transparent wear layer or protective finish. The wear layer may comprise one or more transparent layers of a thermoplastic or thermosetting resin. Non-limiting examples of thermoplastic or thermosetting materials which could be used are polyvinyl chloride (PVC), polystyrene (PS), polyethylene (PE), polyurethane (PU), acrylonitrile butadiene styrene (ABS), polypropylene (PP), polyethylene terephthalate (PET), polybutylene terephthalate (PBT), polytrimethylene terephthalate (PTT), polyethylene naphthalate (PEN), phenolic and/or melamine or formaldehyde resins. Said wear layer may also be in a liquid or paste-like form made of a thermosetting resin such as, but not limited to, phenolic and/or melamine or formaldehyde resins. The wear layer may comprise or may be substantially composed of an inherently scratch-resistant thermosetting resin impregnating a carrier layer such as paper or lignocellulose. An advantage of this latter embodiment is that the urea-formaldehyde also acts as a relatively scratch-resistant wear layer. Typically, a preferred thickness of the wear layer structure in the panel of the invention is in the range of 0.1 to 2.0 mm, more preferably between 0.15 mm to 1 mm and most preferably between 0.2 mm to 0.8 mm. It is conceivable that the wear layer, if applied has a larger thickness than the décor layer, if applied. It is for example possible that at least one wear layer has a thickness of about 0.15 to 1 mm. The total thickness of the decorative top layer is in that embodiment typically between 0.17 to 1.07 mm. Said at least one wear layer may for example cover partly the upper surface of the decorative layer, more preferably at least 50% of said upper surface of the decorative layer is covered, and most preferably, said at least one wear layer covers the entirety of the upper surface of the decorative layer. It is conceivable that said at least one wear layer may further comprise abrasive materials in order to improve the wear resistance thereof. Non-limiting examples of said abrasive materials are: aluminium oxide such as quartz, silica, corundum, carborundum, silicon carbide, glass, glass beads, glass spheres, diamond particles, hard plastics, reinforced polymers and organics, or a combination thereof. At least one wear layer can, for example, be based on any thermoplastic or thermosetting material. The wear layer may further comprise a filler, for example based on calcium, carbonate, talc, or magnesium.

In one possible embodiment, the decorative top layer is basically composed of a carrier material layer designed to be provided with a decorative pattern at the upper side. A suitable material is for example a woven, extruded or calendered plastic net, sheet or film. Non-limiting examples of thermoplastic or thermosetting materials which could be used are polyvinyl chloride (PVC), polystyrene (PS), polyethylene (PE), polyurethane (PU), acrylonitrile butadiene styrene (ABS), polypropylene (PP), polybutylene terephthalate (PBT), polytrimethylene terephthalate (PTT), polyethylene naphthalate (PEN), phenolic and/or melamine or formaldehyde resins.

Alternatively, the decorative top layer may comprise at least one cellulose based layer and possibly a cured resin, wherein the cellulose-based layer is preferably paper, a wood veneer, a bamboo veneer, and the like. Such a decorative top layer can comprise a multitude of such plies of resin impregnated paper or wood veneers.

In yet another alternative embodiment, the panel according to the present invention, and in particular the structural core component thereof, comprises 20-30 parts by weight of a modified polypropylene resin, 20-80 parts by weight of a filler, 1-5 parts by weight of a stabilizer and 1-5 parts by weight of a coupling agent. It has been found that the optimized ratio of raw materials in the composition of the core layer improves the melt flow of the polypropylene resin thereby significantly improving the production process of the panel as well. The flow rate of the modified PP resin is in the range of 1-7 g/10 min, more preferably 1.5-5 g/10 min, most preferably 2-4 g/10 min. Such melt flow rate has been found out to prevent the PP resin from flowing out of the production line thereby making it significantly easier to process (i.e., extrude, mold, etc.). In addition, such melt flow rate allows the modified PP resin to be sheared more effectively to allow for a substantially thorough mixing of the modified PP resin with other raw materials, in particular with the filler material. As a result of this uniform mixing of the composite material of the core layer, delamination of the produced panel is prevented. In an embodiment, the modified PP resin comprises 1-5 parts by weight, preferably 2-4 parts by weight, more preferably 2.1-2.5 parts by weight of maleic anhydride grafted polypropylene (PP-g-MAH). The presence of PP-g-MAH at such amount in the modified PP resin improves the interfacial adhesion between the polypropylene and the other components of the core layer, more with the filler material. As a result, the modified PP resin can be mixed uniformly with other raw materials. Also, the addition of PP-g-MAH significantly improves the melt flow of the modified PP resin. It is conceivable that the modified PP resin has a polymerization degree of about 800-1000. It is also conceivable that the modified PP resin has a molecular weight of about 850-1200. It has been found that at this range, the properties of the modified PP resin are optimized and the properties thereof, such as the tensile strength, is enhanced. This results to a more structurally stable core layer that is less prone to delamination or breakage. In yet another embodiment of the present invention, the modified PP resin is conceived to be a polyolefin-modified PP resin, an acrylic acid-grafted PP resin and a combination thereof. It is conceivable that the modified PP resin comprises a combination of 5 to 20 parts by weight of the polyolefin-modified PP resin and 5 to 20 parts by weight of the acrylic acid-grafted PP resin.

In a possible embodiment, at least one core layer comprises at least two layers, wherein a first layer is formed by at least one structural core component and wherein a second layer is formed by at least one balancing core component. It is further conceivable that the at least one structural core component is a highly filled composition comprising at least 60%, more preferably at least 70%, most preferably at least 75% by weight of a mineral filler and at most 30% of at least one first polymer, for example a polymer resin, preferably at least two polymer resins, wherein at least one resin is chosen from the group of semi-crystalline polyolefins, including but not limited to PP, POP, POE, polyolefin plastomer, polyolefin elastomer, plastomeric additive, PE, PB-1 and/or polypropylene/ethylene copolymer. It is conceivable that the at least one structural core component comprises at least one semi-crystalline polyolefin and at least one plastomeric additive. In a preferred embodiment, said semi-crystalline polyolefin is polypropylene and said plastomeric additive is a polyolefin plastomer and/or polyolefin elastomer, more preferably a propylene/ethylene copolymer. In a preferred embodiment, the at least one structural core component comprises at most 15% by weight of PP, and at least 10%, preferably at least 15% of plastomeric additive. It is conceivable that said structural core component's composition is tuned to achieve a certain flexibility or rigidity, so that a flexibility is imparted when required for use as a gluedown or pliable material, and/or a rigidity is imparted to serve as a component suitable for floating installation. As a non-limiting example, a semi-rigid to rigid structural core component of a thickness of at least 2 mm, preferably at least 3 mm, comprises for example 10% PP and 15% of plastomeric additive, whereas a flexible structural core component of at most 2 mm, preferably at most 1.5 mm, comprises preferably 5-10% PP and 20-25% of at least one plastomeric additive, thereby imparting sufficient flexibility to said structural component. It is found surprisingly that the combination of a high mineral filler content of at least 60%, preferably at least 70% by weight with at most 30% of at least one polymer resin comprising at least one plastomeric resin and/or plastomeric additive imparts sufficient thermal stability to the at least one structural core component while maintaining sufficient flexibility, while simultaneously improving processability of said highly filled composition. It follows from said composition that said at least one structural core component may comprise a highly copolymerized composition with a relatively low crystallinity and/or hardness.

The panel according to the present invention could also comprise multiple core layers, wherein at least two core layers, and preferably each core layer comprises at least one structural core component and at least one balancing core component.

It is further conceivable that at least one balancing core component is provided on at least one surface of said structural core component, preferably opposite from said at least one decorative layer, if applied. It is conceivable that at least one balancing core component is provided on both surfaces of said structural core component. It is conceivable that the at least one balancing core component is a composition comprising at most 40%, more preferably at most 30%, most preferably at most 20% mineral filler. It is conceivable that the at least one balancing core component does not comprise mineral filler and/or plastomeric additive. It is conceivable that the at least one balancing core component, or at least one second polymeric composition, consists substantially of an at least partially isotactic polyolefin such as isotactic polypropylene and/or isotactic PB-1. In a possible embodiment, said at least one balancing core component does not comprise any mineral fillers, in which case said balancing core component consists virtually completely of a semi-crystalline polyolefin, preferably polypropylene, most preferably isotactic polypropylene. In this case, said balancing core component may have a higher degree of crystallinity than the rest of the core layer, more specifically a higher crystallinity than the at least one structural core component.

It is conceivable that said at least structural core component is extruded by a first extruder and said at least balancing core component is extruded by a second extruder. It is conceivable that said at least one structural core component and at least one balancing core component are provided in at least two merging melt flows in one extrusion die, preferably a single manifold die. It is conceivable that the at least one structural core component and the at least one balancing core component are applied in at least two separate melt streams by means of a single extrusion die through a co-extrusion process. It is conceivable that the at least one structural core component is extruded by means of a first extrusion barrel and screw, and/or the at least one balancing core component is extruded by means of a second extrusion barrel and screw. It is therefore conceivable that the at least one structural core component and at least one balancing core component form integral parts of the same core layer.

It is conceivable that said at least one balancing core component, when applied on at least one surface of the at least one structural core component, forms an integral part of the core and may be visually indistinguishable from other layers integral to the core. It is conceivable that differences in composition are reflected by and measurable through means of density measurements, crystallinity levels, and/or Shore D hardness measurements. It is possible that the at least one core layer comprises a layered configuration, wherein at least one structural core component is received between at least two balancing core components. The at least one structural core component and at least one balancing core component can be mutually fused, in particular the adjoining boarders of the at least one structural core component and at least one balancing core component can be mutually fused.

The invention also relates to a process for producing decorative panel in particular a decorative floor, ceiling, building or wall panels, in particular according to the present invention, comprising the steps of:
a) extruding at least one mineral filler and at least one first polymeric composition and/or at least one second polymeric composition, such that at least one polymer sheet is formed comprising at least one structural core component and at least one balancing core component; and
b) laminating at least additional layer, in particular at least one decorative top layer to an upper surface of at least one polymer sheet.

The invention further relates to a process for producing decorative panel in particular a decorative floor, ceiling, building or wall panels, in particular according to the present invention, comprising the steps of:
a) performing a co-extrusion, in particular single manifold co-extrusion of at least one mineral filler and at least one first polymeric composition in combination with at least one second polymeric composition, such that at least one polymer sheet is formed comprising at least one structural core component and at least one balancing core component; and
b) laminating at least additional layer, in particular at least one decorative top layer to an upper surface of at least one polymer sheet.

Each of the processes according to the present invention in particular provides for a panel according to the present invention. Any of the embodiments and/or materials described for the panel according to the present invention also apply to the process for manufacturing such panel. Any of the described preferred embodiments of the process apply to each process according to the present invention. A benefit of the process(es) according to the present invention is that a relatively simple and continuous process can be applied for the production of panels, wherein a panel is obtained which comprises a core layer with an integrated balancing layer. The process according to the invention enables relatively simple and stable production of polymer sheet, in particular crystalline or semicrystalline polymer-based sheet, which could form the basis for a decorative panel, such as a decorative floor, ceiling, building or wall panel. When it is referred to a polymer sheet, also a core layer could be meant. The core layer is typically formed from a polymer sheet as referred in the present invention. Typically, the polymer sheet is cut into (a) core layer(s).

At least one first polymeric composition and/or at least one second polymeric composition comprises at least one semi-crystalline thermoplastic polymer preferably having a glass transition temperature greater than or equal to −50° C. It is for example imaginable that after step a) at least one polymer sheet is subjecting to a first temperature in the range of 45° C. to 115° C., preferably at least 75° C. or in the range of 75° C. to 95° C. in particular via at least one first set of calendering rollers that is preferably displaceable in a first and/or vertical direction and that said polymer sheet is subsequently subjected to a second temperature in the range of 45° C. to 125° C., preferably at least 120° C. via at least second set of calendering rollers that is displaceable in a second and/or horizontal direction, in particular such that said core layer reaches a degree of crystallinity that allows at least one decorative layer to be laminated to said polymer sheet. Such steps are preferably performed prior to step b). Subjecting the polymer sheet to said second temperature may cause a gradient in the degree of the crystallinity of the polymer sheet. Subjecting the polymer sheet to a first and second temperature is preferably done for respectively a first time period and a second time period. The time period can be predetermined and dependent on further process parameters. The polymer sheet as obtained possibly has decreased degree of crystallinity at the interior of the polymer sheet as compared to a degree of crystallinity at the outer surface of the polymer sheet. The process may also comprise the step of subjecting the extruded polymer sheet to a first temperature in the range of 85° C. to 100° C. for a first time period and then undergoing the step of subsequently subjecting the extruded sheet to a second temperature in the range of 50° C. to 65° C. for a second time period. It is conceived that during the heating steps, a gradient in the degree of the crystallinity of the polymer sheet is achieved. More particularly, the polymer sheet has decreased degree of crystallinity at the interior of the polymer sheet as compared to a degree of crystallinity at the outer surface of the polymer sheet. This can for example be evidenced by a heterogeneous Shore D hardness in the polymer sheet. It has been found that the polymer sheet produced by the process according to the present invention can have a Shore D hardness that is higher on at least part of the outer surface of the polymer sheet as compared to the Shore D hardness on at least part of the interior of the polymer sheet. It has been found that such varying Shore D hardness or heterogeneous degree of crystallinity in the entire volume of the polymer sheet imparts enhanced thermal stability to the polymer sheet and the panel in whole. It has been found that such heterogeneous degree of crystallinity within the polymer sheet improves the expansion rate of the floor panel, in particular the expansion rate of the polymer sheet and/or the panel in whole is less than or equal to 0.25%. As a result, the panel of the present invention is able to retain its structural integrity, mechanical properties and functionality at higher temperatures. It is possible that before step b), the extruded polymer sheet is subjected to a third temperature in the range of 85° C. to 100° C. for a third time period via at least one third set of calendering rollers and then subsequently subjected to a fourth temperature in the range of 50° C. to 65° C. for a fourth time period via at least one fourth set of calendering rollers. The polymer sheet can subsequently be subjected to a fifth temperature in the range of 45° C. to 60° C. via at least one fifth set of calendering rollers and a sixth temperature in the range of 25° C. to 40° C. via at least one sixth set of calendering rollers. Subjecting the polymer sheet to a fifth and sixth temperature is preferably done for respectively a fifth time period and a sixth time period. At least one polymer sheet as provided can have a thickness in the range of 1 to 10 mm, preferably 3 to 8 mm, more preferably 4 to 7 mm.

At least one additional layer, in particular at least one decorative top layer, may comprise at least one semicrystalline thermoplastic polymer. It is also possible that at least one decorative top layer comprises polypropylene, in particular a polypropylene foil. The at least additional layer is preferably laminated to the polymer sheet by making use of at least one feeding device. It is also imaginable that multiple additional layers are laminated to the polymer sheet. Lamination can for example be done via fusion bonding. The polymer sheet, or core layer, and the additional layer, for example a decorative top layer, could be fixed to each other in a fusion step wherein heat and pressure are applied such that fusion bonding is established. It is also imaginable that the at least one decorative top layer is a polypropylene foil or a polypropylene foil layer. It is possible that prior to the lamination step, at least part of the surface of the polypropylene foil, if applied, is subjected to a surface treatment. It is also conceivable that at least part of the surface of the PP foil is subjected to a surface treatment simultaneously during lamination step. Said surface treatment is preferably chosen from the group of chemical modification, corona treatment, plasma treatment, polymer modification, or combinations thereof. It is conceivable that during this step, the surface energy of the at least one additional layer and/or the polymer sheet is increased thereby making it easier to laminate said at least one additional layer to the polymer sheet. As a result, the adhesion between the at least one additional layer and the polymer sheet is significantly improved. In addition, it is conceived that carrying out this step reduces the adversities (i.e., fisheye, pinhole, gaps or air bubbles) on the surface of the at least one additional layer and/or the polymer sheet when at least one coating is applied thereto.

The polymer sheet can be subjected to a calendering step, for example by making use of a calendering device. At least one roller of the calendering device can be displaceable in a vertical direction and/or can be heated to at least 75° C., preferably at least 85° C., more preferably at least 95° C. It is also imaginable that least one roller of the calendering device is displaceable in a horizontal direction and/or is heated to at least 120° C., preferably at least 130° C., or more preferably at least 140° C. The polymer sheet could also be subjected to a calibration step, for example via a calibration device. At least part of the rollers of the calibration device can have a temperature range of 90° C. on a first end to 60° C. on a second end. At least part of the rollers of the calibration device can have a temperature range of 50° C. on a first end to 30° C. on a second end. It has been found that at these temperature ranges, the degree of crystallization of the polymer sheet is controlled thereby ensuring that the degree of crystallinity of the polymer sheet on at least part of the outer surface thereof is higher than the degree of crystallinity on at least part of the interior thereof. It is also imaginable that the means for applying pressure are applied and that at least part of the rollers of the means for applying pressure have a temperature range of 35° C. on a first end to 25° C. on a second end. It has been found that at such temperature ranges, the inner stress of the polymer sheet is relieved thereby ensuring the flatness of the polymer sheet and the panel in whole.

The panel according to the invention preferably comprises at least two pairs of opposing side edges wherein at least one pair of opposite side edges, and preferably each pair of opposite side edges, is provided with complementary coupling parts. In a preferred embodiment, at least one pair of opposite side edges of the core layer is provided with complementary coupling parts. Yet in a further preferred embodiment, at least one and preferably each pair of opposite side edges is provided with complementary coupling parts. Hence, it is conceivable that at least one conductive structure is provided upon at least part of a coupling part. The complementary coupling parts, if applied, are typically configured for interconnecting adjacent panels. For example, the core layer comprises at least one pair of complementary coupling parts on at least two of its opposite side edges. Said coupling parts may for example be interlocking coupling parts configured for mutual coupling of adjacent panels in multiple directions. Preferably, said interlocking coupling parts provide locking in both horizontal and vertical directions. Any suitable interlocking coupling parts as known in the art could be applied. For example, said interlocking coupling parts may be in the form of complementary tongue and groove, male and female receiving parts, a projecting strip and a recess configured to receive said strip or any other suitable form. It is conceivable that the complementary coupling parts require a downward scissoring motion when engaging, or are locked together by means of a horizontal movement. It is further conceivable that the interconnecting coupling mechanism comprises a tongue and a groove wherein the tongue is provided on one side edge of one pair of opposite side edges, and the groove is provided on the other side edge, or an adjacent side relative to that of the tongue, of the same pair of opposite side edges. Such a design of coupling mechanism is well-known in the art and has proven highly suitable for panels for floor coverings such as a floating floor. In a further embodiment it is possible that the interconnecting coupling mechanism has an interlocking feature which prevents interconnected panels from any free movement (play). Such an interlocking feature may be a projection and a respective recess provided on the respective opposite side edges by which neighboring panels interlock with each other. It is conceivable for provisions of reinforcement in the interlocking coupling parts to improve strength and prevent breakage thereof during installation of the panels. For example, the complementary or interlocking coupling parts may be reinforced with materials such as but not limited to fiberglass mesh, reinforcing sheets, ceramics, glass, arrays of non-metallic rods, or polymer compounds integrally formed in the core layer. It is also conceivable that a strengthening coat layer of micro or nanotechnology is added to the surface of the interlocking coupling parts. In case such coating is applied, the at least one conductive structure is applied upon said coating.

The invention also relates to an extrusion line for the production of decorative floor, ceiling, building or wall panels or building panels in particular according to the present invention, preferably via a process according to any the present invention, comprising:

at least one extruder configured for extrusion, in particular configured for co-extrusion, more in particular single manifold co-extrusion of at least one mineral filler and/or at least one first polymeric composition preferably in combination with at least one second polymeric composition;

at least one calendering device comprising a plurality of calendering rollers for forming a polymer sheet from a melt obtained from the extruder, wherein at least one roller, and preferably each roller, is configured to be heated;

at least one feeding device for feeding at least one additional layer to the polymer sheet such that said additional layer is laminated to the polymer sheet; and at least one calibration device comprising at least two rollers through which the polymer sheet can be guided.

The extrusion line according to the present invention enables the production of a panel comprising at least one core layer which comprises at least one structural core component and at least one balancing core component according to the present invention. The extrusion line also enables the production of laminated decorative panels having a polymer sheet, herein referred to as the core layer, and at least one additional layer which can be used as for example a floor, ceiling, wall, or building panel, wherein said panels have a uniform thickness and quality. Alternatively, at least one extruder can be configured for polymer extrusion, in particular polypropylene extrusion. The extruded panels obtained via an extrusion line according to the present invention can, for example, have a core layer thickness of at least 2 mm, for example in the range of 2 to 8 mm or in the range of 3 to 7 mm. The core layer of the produced panels, or thus the polymer sheet, can have a thickness in the range of 1 to 10 mm, preferably 3 to 8 mm, more preferably 4 to 7 mm.

Due to the extrusion line making use of an extruder in combination with at least one calendering device, at least one feeding device and at least one calibration device according to the present invention, the production of laminated decorative panels from semi-crystalline polymers with low glass transition temperature, is enabled in an efficient and effective manner. It is conceivable that the extrusion line can also be a co-extrusion, tri-extrusion, or an extruder that utilizes at least two different materials or resins with differing properties. In a preferred embodiment of the present invention, the extrusion line is a co-extrusion extruder utilizing at least one highly filled polyolefin composition comprising at least one plastomeric additive and at least one isotactic polyolefin, preferably isotactic polypropylene. In some embodiments, the other extruder materials can be wood or mineral materials that can be extruded along with the main polymer, more specifically a semi-crystalline polymer with a low glass transition temperature. The extrusion line according to the present invention benefits from the presence of an integrated lamination process by making use of a feeding device feeding at least one additional layer to the polymer sheet. The feeding device for example enables that an additional layer, such as a backing layer and/or an acoustic layer can be added to the polymer sheet. It is also imaginable that the feeding device is configured to apply an additional layer in the form of a decorative layer, such as but not limited to decor paper and film directly to the polymer sheet. At least one acoustic layer can for example be a foamed acoustic layer.

Semi-crystalline non-halogenated thermoplastic polymers (i.e., polypropylene, low-density polyethylene, high-density polyethylene, polyoxymethylene, polybutene-1 and the like), in the following referred to as semi-crystalline thermoplastics, is a versatile group of thermoplastic polymers that has certain advantages over halogenated amorphous thermoplastics for plastic extrusion, including a low cost, a low coefficient of thermal expansion, ease of recyclability, sustainability, and strength.

Semi-crystalline thermoplastic polymers or polyolefins such as PP with a relatively low glass transition temperature (Tg) melt at a relatively elevated temperature and have the characteristic to cool down very rapidly due to a high thermal conductivity and low specific heat capacity. Moreover, the creation of crystalline blocks in the polymer chain typical for semi-crystalline polymers may cause residual stresses and warping and bending of the extruded panel or sheet. This results in a challenge to extrude such type of semi-crystalline polymer into a flat and consistent sheet, which is free of irregularities, and which is relatively thick. However, conventional extrusion lines for thermoplastic polymers, which are normally used for production of luggage, microwavable food containers, cutting boards, window components, and the like, are not automatically suitable for production of decorative panels such as flooring products. In conventional extrusion lines, the surface flatness of extruded sheets is difficult to control, making it impossible for existing extrusion lines to produce very large, flat surfaces, which is a requirement that needs to be met for decorative panels such as flooring products. In addition, it is exceedingly difficult to achieve consistency of melt flow in conventional extrusion lines for semi-crystalline polymers with a relatively low viscosity and are in a near liquid state when subjected to high temperature thereby making semi-crystalline polymers, specifically semi-crystalline polyolefins difficult to handle and work with. As a result, conventional extrusion lines are not cut out to produce decorative panels such as flooring products that require consistent thickness and substantial structural stability to allow the application of locking mechanisms thereto. Moreover, when such a semi-crystalline thermoplastic or semi-crystalline polyolefin compositions features a high weight % of mineral filler, i.e., they are highly filled, the combination of the crystallinity of the extruded semi-crystalline thermoplastic, combined with a high mineral content, causes brittleness and breakage, especially when interlocking coupling means are provided in such a material, due to a lack of flexibility. Furthermore, the thermolamination of at least one of said resilient decorative panel's composite layers, such as the thermolamination of at least one decorative top layer to at least one core layer, may prove challenging due to the nature of said semi-crystalline thermoplastics, including a low surface energy, thermal sensitivity, and lack of polar groups that may facilitate adhesion.

In view of the foregoing, semi-crystalline thermoplastic polymers, specifically semi-crystalline polyolefins, are deemed a promising group of materials for use in the flooring industry, but still have disadvantages compared to the state of the art. In view thereof, there is a need for an improved extrusion line or device that can be used for the production of decorative panels such as flooring products. In particular, there is a need for an extrusion line which can handle semi-crystalline thermoplastic polymers with a low glass transition temperature and low viscosity, wherein the temperature can be effectively controlled to solve problems related to the attainment of a relatively large, flat surface and a consistent thickness in the manufactured floor product. There is further a demand for an improved extrusion line or device that can be used to produce highly filled polypropylene flooring, sheets, composite layer and/or at least one core layer, and/or to subsequently laminate said sheets and/or at least one core layer to a decorative top layer comprising polypropylene. The extrusion line according to the present invention fulfils this need.

At least one extruder of the extrusion line according to the present invention is preferably a twin-screw extruder. It is for example imaginable that at least one extruder is a co-rotating twin screw extruder wherein the screws are preferably co-rotating and/or intermeshing. This allows self-wiping of the screw and better transfer of polymer from one screw to another. A further benefit of using at least one twin screw extruder is that a positive throughput of polymer material can be enabled. The use of a twin-screw extruder further enables the production of panels with a relatively large thickness. It was experimentally found that a single screw extruder is limited to a specific sheet or panel thickness since single screw extruders are typically inclined to carry out back pushing, resulting that if more material is being inputted, the material typically gets stuck in the screw. As a result, the deposit material is likely to damage the screw and/or barrel and the material goes out of the exhaust or ventilation port. Hence, in the case of producing relatively thick decorative panels, it is preferred to apply at least one twin screw extruder.

The efficiency of the extruder at least partially depends on the ratio of the flighted length of the screw to its outside diameter, in particular the L/D ratio. The larger the ratio, the more shear heat can be uniformly generated in the polymer melt without degradation. A relatively large L/D ratio also provides good mixing characteristics, resulting in a good homogeneity of the melt. In a preferred embodiment, at least one twin screw has an L/D ratio in the range of 20-30:1.

The screw design can be adapted for the applied first and/or second polymers and the desired product. The screw design can for example be configured for pressure control, enabling the presence of multiple feeding and vent points, improved mixing and efficiency and control of how much material flows inside the barrel and how long it stays on that section of the screw. A cooling system, for example a water-cooling system, can be applied for control of the extruder temperature. Water cooling system is preferred over air cooling system, which is typical in conventional extrusion lines, as it provides a more consistent and uniform cooling since water is a better conductor of heat than air but is not easily affected by changes in ambient temperature and humidity. It is imaginable that at least one twin screw extruder has a screw profile comprising a feed section, a transition section and a meter section. The feed section is the defined as the section where the polymers first enter the screw and is conveyed along a constant root diameter. The transition section is the section where the polymers are conveyed, compressed, and melted along a root diameter that increases with a constant taper. The meter section is defined as the section where the melting of the polymers is completed and the melt is conveyed forward along a constant root diameter, reaching a temperature and viscosity that is necessary to form parts. In a preferred embodiment, the twin screw has a screw profile having at least 30%, preferably in the range of 30-60%, more preferably in the range of 40-50% of flighted area in particular in a feed section thereof. In a preferred embodiment, the twin screw has a screw profile having at least 20%, preferably in the range of 20-35%, more preferably in the range of 25-30%, of flighted area in a transition section and/or meter section thereof. This enables controlled extrusion of the polymer material, in particular in case a polymer is applied which is relatively crystalline or semi-crystalline.

In a possible embodiment, the twin screw has a compression ratio ranging from 2:1 to 4:1, preferably 2.7:1, more preferably 3.3:1. The higher the compression ratio, the greater the resulting shear heat imparted to the polymer, the heat uniformity of the melt and the potential for creating stresses in the polymer. The channel depth of at least one extruder can be adapted based on the degree of shear heat imparted to the polymer. It is for example possible that the twin screw has a meter channel depth measuring between 2% and 8%, preferably 2.7% and 7%, more preferably between 3.5% and 6% of the screw diameter. The helix angle of the screw is preferably a standard square pitch. The twin screw could further comprise conveying elements, deeding block element and/or flow restrictors. This could be useful for the softening and/or dispersion of the polymer and/or additives and/or to reverse the polymer melt and/or mixing of the melt.

The extruder could further comprise at least one melt pump and/or gear pump. The melt pump and/or gear pump could comprise at least two gears and is preferably driven by a single motor. Typically, the extruder fills the gears from the suction side and the rotating gears discharge the polymer on the other side. The principle is that a well-made gear will have a very accurate profile, and when that gear is enclosed in a tight-fitting housing, the volume of plastic in each tooth will be very precise. As the gears turn, they meter an exact amount of plastic on the discharge side. It is conceivable that the speed of the gear rotation can be closely controlled by an AC or DC drive which is preferably designed for less than 1% variation. An advantage of using said melt pump and/or gear pump is the precise control of its output pressure to the die, eliminating pressure variables and so-called pulsating that impact extruder throughput stability and compensates for such things as poor or erratic temperature control, feed interruptions, changes in the polymer mix (i.e., varying amounts of regrind) and surging due to imprecise screw design and composition irregularities.

Despite it being preferred that the extrusion line according to the invention comprises a twin-screw extruder, it is also imaginable that the extrusion line comprises a single-screw extruder. Further, an embodiment is imaginable wherein the extrusion line comprises a combination of at least one twin screw extruder and at least one single screw extruder. The latter is in particular beneficial in case a core layer comprising an integrated balancing layer is to be produced.

The extrusion line preferably comprises at least one pulling device for pulling the polymer sheet through at least part of the extrusion line. The use of at least one pulling device can further optimize the efficiency of the extruder. The pulling device can also positively contribute to a stable and uniform result of the final product(s). The pulling device(s) can positively contribute to control of the production process. It is imaginable that the extrusion line comprises at least one cutting device for cutting at least part of the polymer sheet, in particular at least one edge of the polymer sheet. When it is referred to polymer sheet, a laminated polymer sheet or laminated panel can be meant.

The extruder typically comprises a least one primary hopper for feeding at least one polymer to the screw. Preferably, the extruder also comprises at least one secondary hopper for feeding at least one additive to the screw. The extruder further typically comprises a barrel and a die. In a further preferred embodiment, it is imaginable that at least one gear pump is disposed between said barrel and said die. The gear pump is preferably configured for maintaining a constant pressure and a consistent or even melt flow. As a result, an even melt flow will be fed to the die that allows to have consistent thickness of the panel being produced.

The calendering device is, in particular, configured to make the polymer melt in a workable form that can be shaped and handled in a desired way. The calendering device is typically configured to gradually decrease the temperature of the polymer melt and to enable shaping of the polymer melt into a polymer sheet of a desired thickness. It is conceivable that at least part of the calendering rollers of the calendering device is therefore configured to be heated and/or cooled. Hence, it is imaginable that at least one roller, and preferably each roller comprises a heater, for example an integrated heater and/or an oil- or water-based temperature control system or device.

The calendering device is configured to control the temperature of the polymer melt, in particular the cooling rate of the polymer melt and consequently the solidification process of the polymer melt via a temperature control device that is deployed in at least one part of the extrusion line, wherein the temperature control device comprises at least one temperature sensor; a processing device for determining if the temperature is within the acceptable parameters; and at least one heating or cooling element for varying the temperature in at least one part of the extrusion line. During the passage of the polymer melt in the calendering device, the polymer chains are rearranged and crystalline regions start to form. In the present invention, the calendering device allows the polymer melt to cool at a rate that allows for more extended chain mobility such that additional time for crystallization is provided. As a result, a higher degree of crystallinity is achieved for the polymer melt.

In a preferred embodiment of the invention, the calendering device comprises at least a first set of calendering rollers that is heated, via at least one heating means, to a first temperature range, say for example in the range of 45° C. to 115° C. or 75° C. to 95° C., to which the polymer melt is first subjected. During the passage of the polymer melt through said first set of calendering rollers, crystalline regions and/or blocks may be formed within the polymer melt, and this can be referred to as the nucleation phase. In a preferred embodiment of the invention, the calendering device comprises at least a second set of calendering rollers heated via at least one heating means, to a second temperature range, say for example in the range of 45° C. to 150° C., to which the polymer sheet is subsequently subjected. During the passage of the polymer melt to said second set of calendering rollers, the formed nuclei in at least one region of the polymer melt may grow by diffusion of polymer chains onto the crystal surfaces. The crystalline chains then align themselves in an ordered manner, increasing the size thereof. At this stage, the desired degree of crystallinity of at least one region of the polymer sheet that allows the lamination of an additional layer thereto is achieved.

The calendering device typically comprises a plurality of calendering rollers for forming a polymer sheet from a melt obtained from the extruder, wherein at least one roller, preferably multiple rollers, and more preferably each roller, is configured to be heated and/or cooled. It is for example imaginable that at least one roller of the calendering device, and preferably each roller, is an oil heated roller. In this way, the temperature of the roller(s) can be controlled in an efficient and effective manner. The oil heated rollers enable typically a relatively steady temperature control, preferably with graduations within 1 to 2° C. However, it is also imaginable that at least one roller is an electrically heated roller which is controlled via a thermoregulation system having a processing unit for a more precise control of heating and/or cooling. It is conceivable that the said thermoregulation system comprises at least one sensor, preferably an optical sensor for measuring the temperature of the rollers and/or any part of the extrusion line. At least one roller could also be heated with gas, which is in particular useful for rollers with high temperature, or water, which is in particular useful for rollers with lower temperature. Applying at least one heated roller is beneficial for the stability and consistency of the final product(s).

The first set of calendering rollers can for example be heated, possibly via at least one heating means, to a range of 45° C. to 115° C., preferably at least 75° C. or in a range of 75° C. to 95° C., to which the polymer sheet is subjected. A second set of calendering rollers is heated, possibly via at least one heating means, to a range of 45° C. to 125° C., preferably at least 120° C. or alternatively 75° C. to 95° C., to which the polymer sheet is subsequently subjected. The extrusion line can be configured such that the polymer sheet reaches a degree of crystallinity that allows at least one additional layer to be laminated to said polymer sheet. Subjecting the polymer sheet to the at least second set of calendering devices may cause a gradient in the degree of the crystallinity of the polymer sheet.

In a preferred embodiment, the calendering device comprises at least three calendering rollers, more preferably at least four rollers, which are configured for forming the polymer sheet. Preferably, at least one roller, and preferably multiple rollers have a relatively good conductivity. It is imaginable that, at least one roller, and preferably multiple rollers are at least partially made of a conductive material, such as but not limited to metal. At least one roller is preferably a rigid roller. In a further preferred embodiment, the calendering device comprises at least one soft roller, in particular at least one rubber roller. At least one soft roller could be configured to optimize the lamination process. The calendering device could comprise at least one embossing roller. In a preferred embodiment, the soft roller(s) and the embossing roller(s) are positioned such that the soft roller(s) enables lamination whilst the embossing roller(s) subsequently provides an embossing structure into at least one side of the polymer sheet. In a further preferred embodiment, the calendering device comprises at least one heating device such as a lamp, infrared lamp, or any other heating means disposed in between said at least one soft roller and said at least one embossing roller. At least one heating device could be used to heat up the material and/or to contribute to lamination of at least one additional layer to the polymer sheet.

It is imaginable that the calendering device comprises a plurality of roller pairs, wherein a first roller pair is displaceable in a first direction and wherein a second roller pair is displaceable in a second direction, wherein the first direction differs from the second direction. It is for example imaginable that at least one roller pair is displaceable in at least a vertical and/or horizontal direction. The calendering device is preferably configured such that at least one roller of the calendering device is displaceable in a vertical direction, at least one roller of the calendering device is displaceable in a horizontal direction and/or at least one roller is substantially fixed. It is also imaginable that the calendering device is configured such that at least one roller of the calendering device is displaceable in a vertical direction, at least one other roller of the calendering device is displaceable in a horizontal direction and/or at least another one roller is substantially fixed. Preferably, at least one roller of the calendering device that is displaceable in a vertical direction is heatable or heated to at least 70° C., preferably at least 85° C., more preferably at least 95° C., in particular during manufacturing of at least one decorative panel. Preferably, at least one roller of the calendering device that is displaceable in a horizontal direction is heatable or heated to at least 75° C., preferably at least 85° C., more preferably at least 120° C. In case the calendering device comprises at least one roller that is substantially fixed, said roller is preferably disposed between at least two rollers which are at least displaceable in a horizontal direction. When it is mentioned that roller is substantially fixed, it can be meant that the roller is substantially stationary during the extrusion process applied whilst making use of the extrusion line according to the present invention.

It is conceivable that the at least one roller of the calendering device has a diameter in the range of 300 mm to 550 mm, preferably in the range from 350 mm to 500 mm, more preferably from 400 mm to 450 mm.

In a preferred embodiment, multiple calibration devices are deployed throughout or at least a part of the extrusion line wherein the said devices contribute to the calibration and stabilization of the polymer sheet and thus the final product. The calibration devices are configured to relieve the inner stress in the material, make the material more flat, control the crystallization of the material, and/or control the cooling speed of the material. Preferably, the sequence of calibration rollers has different temperatures that function like tempering which help prevent a cupping effect. It was experimentally found that a series of at least three calibration devices is optimal to achieve the desired technical effect of the present invention. It is also imaginable that the first and second calibration device form part of a single calibration device having a first and second calibration section.

The first calibration device preferably comprises at least four roller pairs, preferably at least six roller pairs. The second calibration device preferably comprises at least four roller pair, preferably at least six roller pairs.

In a preferred embodiment, at least one roller, and preferably multiple rollers, of the first calibration device and/or the second calibration device is/are configured to be heated via at least one heating means. It is conceivable that the at least one heating means utilizes oil, water, gas or electricity to heat the at least one roller to the desired temperature range. Preferably, oil is used for high temperature ranges to keep the temperature stable.

The rollers of the first calibration device preferably have a temperature range of 90° C. on a first end to 60° C. on a second end during the extrusion process. Hence, at least part of the roller of the first calibration device are heated or heatable to at least 60° C. It is imaginable that at least one roller has a temperature gradient, in particular during use. It is also imaginable that there is a temperature gradient between adjacent roller, in particular of the same calibration device. The rollers of the second calibration device could for example have a temperature range of 50° C. on a first end to 30° C. on a second end.

The extrusion line could further comprise at least one further calibration device comprising at least three rollers which are in particular arranged in a manner such that the polymer sheet is at least partially elevated. It is for example possible that the rollers are arranged such that the polymer sheet is elevated to a predetermined degree. It is for example imaginable that the rollers are arranged such that the polymer sheet is elevated to an angle ranging from 10 to 35 degrees, preferably at least 10 degrees, more preferably at least 20 degrees.

The extrusion line could further comprise means for applying pressure onto at least one surface of the polymer sheet. Preferably, the pressure is applied onto at least the bottom surface of the polymer sheet after the polymer sheet passes through the calibration device, in particular the second calibration device. It is conceivable that the means for applying pressure comprises at least one roller, preferably at least five rollers. In a preferred embodiment, at least one roller, and preferably multiple rollers, of means for applying pressure is/are configured to be heated via at least one heating means. The rollers of the means for applying pressure are conceivable to be heated to a temperature range of 35° C. on a first end to 25° C. on a second end. It is conceivable that the at least one heating means utilizes oil to heat the at least one roller to the desired temperature range. It is also conceivable that gas or water is used in the at least one heating means. Preferably, oil is used for high temperature ranges to keep the temperature stable.

The extrusion line according to the present invention typically comprises at least one feeding device for feeding at least one additional material or layer to the polymer sheet in particular such that said additional layer is laminated to the polymer sheet. The extrusion line could also comprise multiple feeding devices wherein each feeding device is configured for feeding an additional layer to the (laminated) polymer sheet. It is imaginable that at least one feeding device is configured for feeding at least one top layer to the polymer sheet such that said top layer is laminated to the polymer sheet. It is also imaginable that at least one feeding device is configured for feeding at least one backing layer to the polymer sheet such that said backing layer is laminated to the polymer sheet. It is also imaginable that at least one feeding device which is configured for feeding multiple additional layers to the polymer sheet. The extrusion line, and in particular the feeding device, could for example comprise at least one pair of rollers for guiding at least one additional layer, preferably wherein at least one roller and preferably each roller is configured to be heated. At least one roller is preferably configured to be heated to at least 35° C. to 60° C., preferably from 40° C. to 55° C., more preferably from 45° C. to 50° C. At least one feeding device is preferably positioned such that at least one additional layer is fed to the polymer sheet at a level located between two adjacent rollers of the calendering device. In this way, the co-action between the feeding device and the calendering device can be optimized. At least one feeding device could comprise at least one feeding tension controller. Such controller is in particular configured to control the force applied in the additional layer upon loading thereof. Further, the feeding device could comprise at least one pair of rollers, in particular configured for guiding at least one additional layer to the polymer sheet. The temperature of these rollers is preferably controllable. Hence, at least one roller may be a heated or heatable roller. The rollers of the feeding device, if applied, typically have a lower temperature during operation than the calendering rollers.

It is possible that the extrusion line further comprises at least one cutting device for cutting at least part of the (laminated) polymer sheet, in particular at least one edge of the polymer sheet. The cutting device could contribute to obtaining the desired final product(s). The extrusion line could also comprise at least one cooling device for cooling at least part of the polymer sheet. It is for example possible that at least one cooling device is configured for cooling at least part of the polymer sheet via air cooling or water bath. Air cooling can provide a controllable and effective way of cooling which does not negatively affect the product. It is also imaginable that the extrusion line could optionally comprise at least one unloading device. The unloading device could be configured for unloading the semi-final or final products.

The invention further relates to a process for producing decorative floor, ceiling or wall panels by making use of an extrusion line according to the present invention.

BRIEF DESCRIPTION OF THE FIGURES

The invention will be further elucidated by means of non-limiting exemplary embodiments illustrated in the following figures, in which:

Within these figures, similar reference numbers correspond to similar or equivalent elements or features.

FIG. 1 shows a schematic representation of an exploded cross section of an embodiment of a first possible embodiment of a panel 10 according to the present invention. The panel 10 comprises at least one core layer 100 and at least one decorative top layer 200 situated on a top surface of the core layer 100. The at least one core layer 100 further comprises at least one structural core component 101 and at least one balancing core component 102 that is situated on at least one side of the at least one structural core component 101. In the shown embodiment, the structural core component 101 is positioned above the balancing core component 102. The balancing core component 102 forms integral part of the core layer 100. The at least one decorative top layer 200 of the shown embodiment comprises at least one décor layer 201, at least one a wear layer 202 situated on a top surface of the décor layer 201, and a coating layer 203 situated on a top surface of the wear layer 202. The structural core component 101 comprises at least one mineral filler and at least one first polymeric composition and at least one balancing core component 102 comprises at least one second polymeric composition.

FIG. 2 shows a schematic representation of an exploded cross section of another embodiment of a panel 20, for example a floor panel, according to the present invention. The panel 20 comprises at least one core layer 100, at least one decorative top layer 200 situated on a top surface of the core layer 100, and an optional acoustic layer 300 situated on a bottom surface of the core layer 20. The at least one core layer 100 further comprises at least one structural core component 101 that is sandwiched between at least two balancing core components 102. The at least one decorative top layer 200 further comprises at least one décor layer 201, at least one wear layer 202 situated on a top surface of the décor layer 201, and a coating layer 203 situated on a top surface of the wear layer 202.

FIG. 3 shows a schematic representation of part of an extruder 30 as applied in a process and extrusion line according to the present invention. The least one extruder 30 is in particular a twin-screw extruder 30. The extruder 30 is configured for extruding materials for forming a structural core component and materials for forming a balancing core component to separate screws of the 31a, 31b of the extruder 30 which can subsequently be fed to the same die 35. The first extruder is a twin screw extruder 31a for extruding a mineral filler and a first polymer material or first polymeric composition. The second extruder is a single screw extruder 31b for extruding a second polymer material or second polymeric composition. A vacuum 32 can be applied to the twin screw extruder 31b. Each extruder 31a, 31b comprises a hopper 33 for feeding the materials to the screws. Heating means 34 are preferably applied to heat at least part of the melt in the extruders 31a, 31b. The extruder 30 as shown comprises a single manifold extrusion die 35. The device further comprises a gear boxes 36, gear pumps 37 and filters 38. The diameter of the single screw 31b is smaller than the diameter of the twin screw 31a.

FIG. 4 shows a schematic representation of part of a production process according to the present invention. The system basically shows part of an extruder and a lamination system for producing a panel 25 according to the present invention. The extruder inlet 43 is shown, followed by a single manifold extrusion die 41. The produced polymer sheet 200 is fed through a series of rollers 50. One of the rollers can be an embossing or texture roller. An additional layer 300, in particular a decorative top layer 300 is fed to the polymer sheet 200 via a feeding device 51. Heating elements 52 are provided to heat at least part of the polymer sheet 200. A pulling device 54 is shown too. Indicative temperatures of the process are indicated in the figure.

CLAUSES

Figure 1:
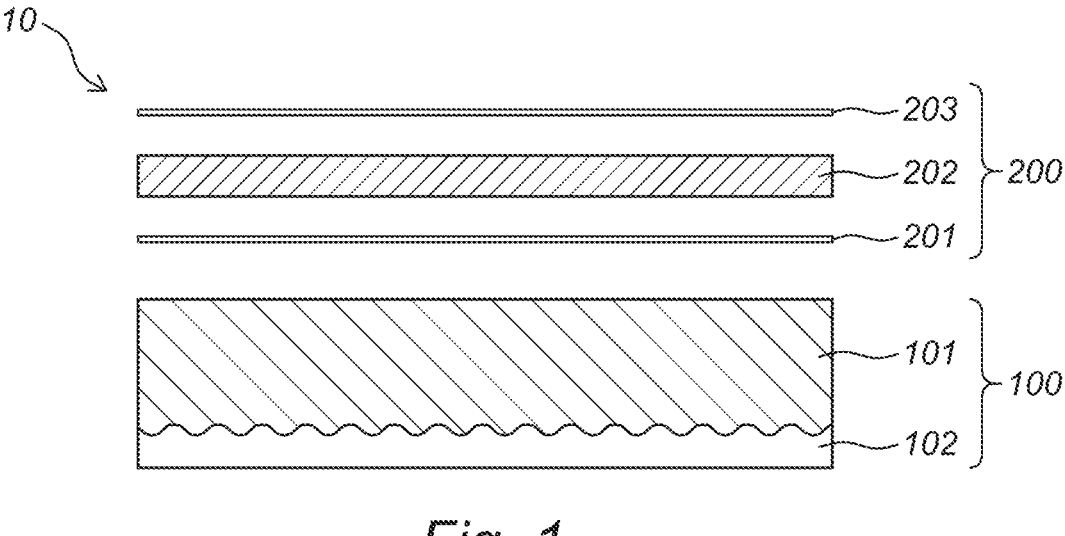
FIG. 1 shows a cross section of an embodiment of a floor panel according to the present invention.
Figure 2:
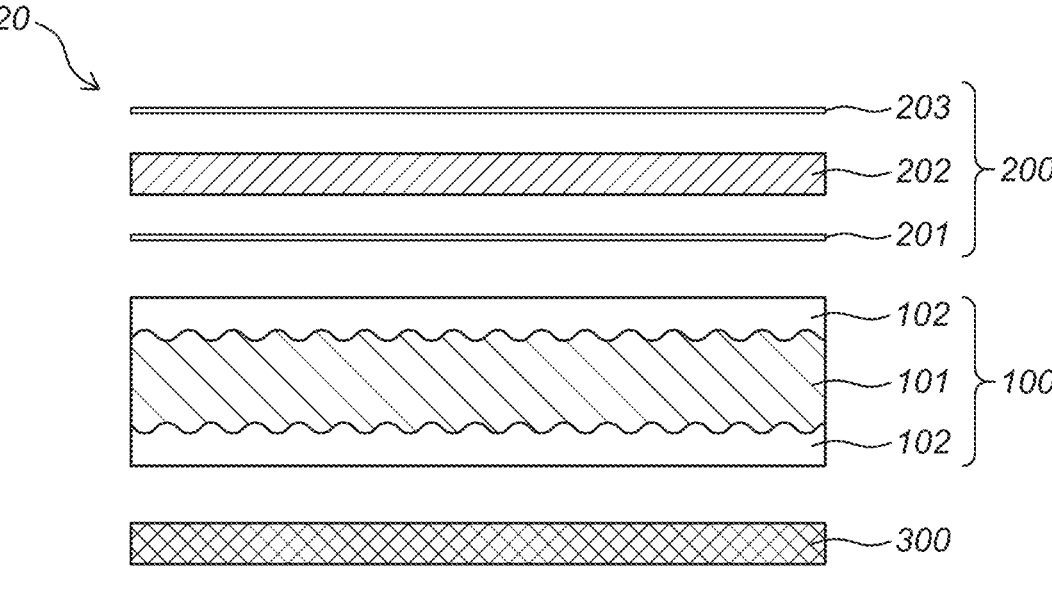
FIG. 2 shows a cross section of an embodiment of a floor panel according to the present invention.
Figure 3:
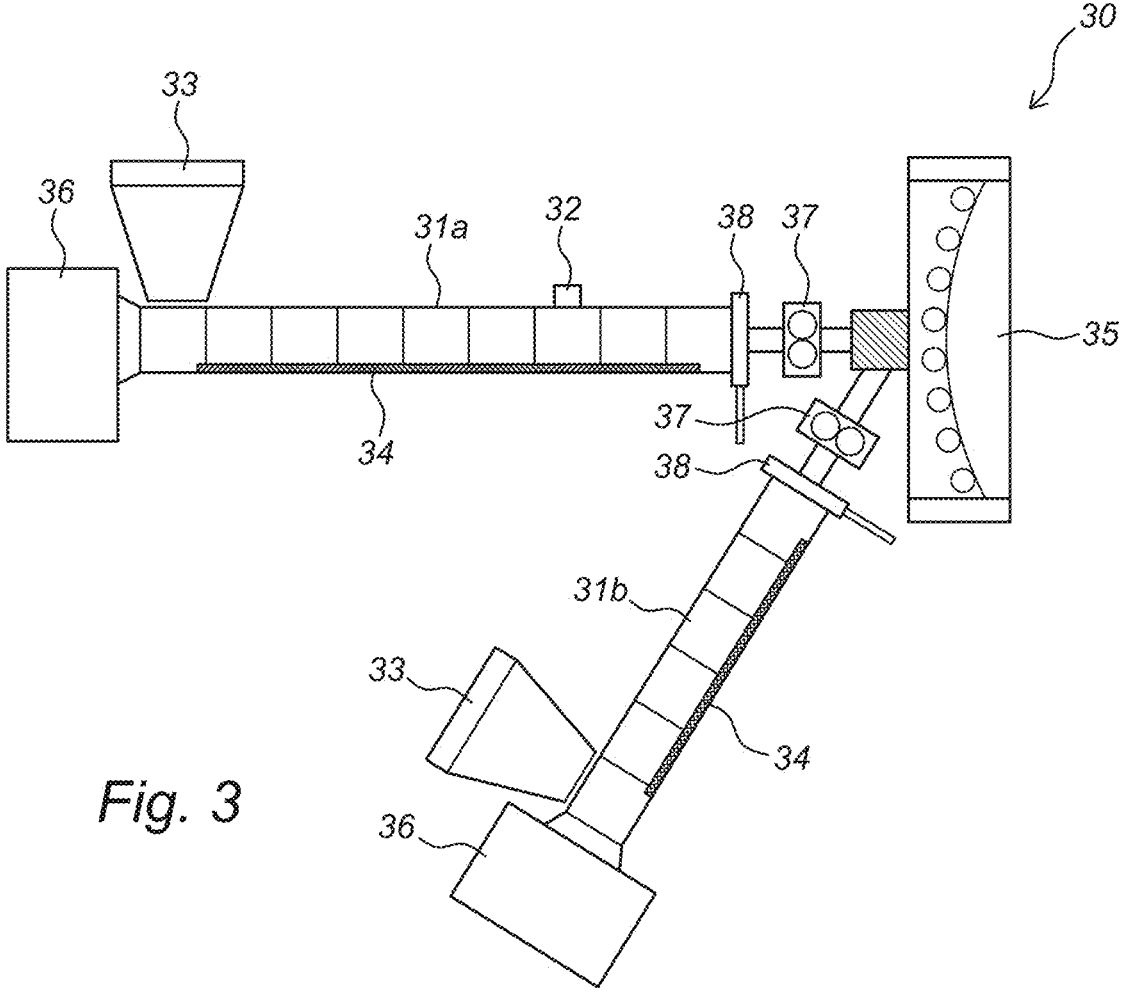
FIG. 3 shows a perspective view of part of an embodiment of an extrusion line according to the present invention.
Figure 4:
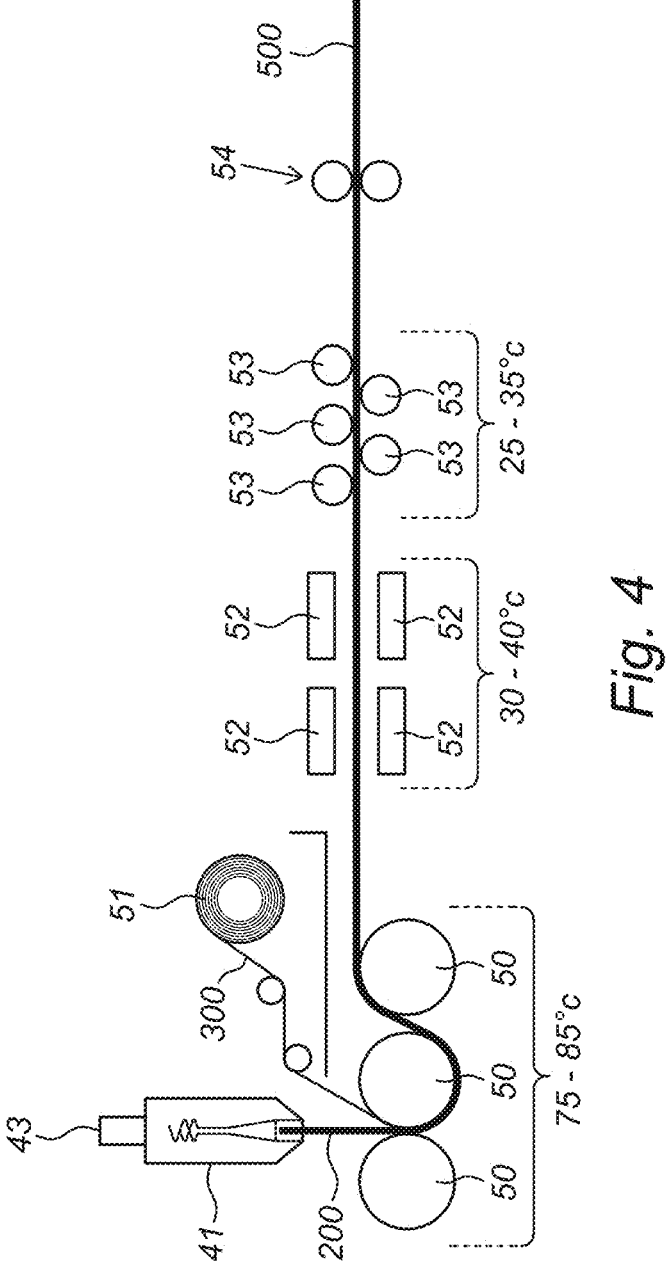
FIG. 4 shows a schematic representation of part of a production process according to the present invention.

The invention will be further elucidated based on the following non-limitative clauses.

1. A decorative panel, in particular a floor, ceiling, building or wall panel, comprising at least one core layer and preferably at least one decorative top layer, wherein at least one core layer comprises at least one structural core component and/or at least one balancing core component, wherein at least one structural core component has a first hardness and/or crystallinity, and wherein at least one balancing core component has a second hardness and/or crystallinity, wherein the second hardness and/or crystallinity is preferably 3-35% higher than a first hardness and/or crystallinity.

2. The panel according to clause 1, wherein at least one structural core component comprises at least one mineral filler and at least one first polymeric composition and wherein at least one balancing core component comprises at least one second polymeric composition.

3. A decorative panel, in particular a floor, ceiling, building or wall panel, comprising:
   at least one core layer; and
   at least one decorative top layer;
   wherein at least one core layer comprises at least one structural core component and at least one balancing core component, wherein at least one structural core component comprises at least one mineral filler and at least one first polymeric composition and wherein at least one balancing core component comprises at least one second polymeric composition.

4. The panel according to any of the previous clauses, wherein at least one core layer is a co-extruded core layer and/or wherein at least one first polymeric composition and/or at least one second polymeric composition comprises at least one semi-crystalline thermoplastic polymer, preferably wherein at least one semi-crystalline thermoplastic polymer is a non-halogenic semi-crystalline thermoplastic polymer selected from the group of: polyethylene (PE), polyethylene terephthalate (PET), polybutene-1 (PB-1), polymer environmental resin (PER), polylactic acid (PLA) and/or polypropylene (PP).

5. The panel according to any of the previous clauses, wherein at least one structural core component comprises at least 60%, preferably at least 70%, most preferably at least 75% by weight of at least one mineral filler.

6. The panel according to any of the previous clauses, wherein at least one mineral filler of at least one structural core component is chosen from the group of: limestone, talc, calcium carbonate, magnesium, magnesium dihydroxide, magnesium dihydrate, aluminium trihydroxide, aluminium trihydrate, and combinations thereof.

7. The panel according to any of the previous clauses, wherein at least one structural core component, and in particular at least one first polymeric composition comprises at least one plastomeric additive.

8. The panel according to clause 7, wherein at least one plastomeric additive is a copolymer of ethylene and at least one a semi-crystalline thermoplastic polymer.

9. The panel according to clause 7 or clause 8, wherein at least one plastomeric additive comprises 2-30 wt %, preferably 5-20 wt %, more preferably about 10-15 wt % of ethylene and/or ethylene units.

10. The panel according to any of clauses 7-9, wherein at least one plastomeric additive has a density of 0.8 to 1 g/cm3, in particular 0.862 to 0.912 g/cm3.

11. The panel according to any of clauses 7-10, wherein at least one plastomeric additive comprises at least one elastomeric polyolefin comprising isotactic, syndiotactic and/or atactic polyolefin blocks.

12. The panel according to any of clauses 7-11, wherein at least one plastomeric additive is manufactured by means of metallocene catalysis and/or a solution process.

13. The panel according to any of the previous clauses, wherein the at least one structural core component, and in particular at least one first polymeric composition comprises at least one copolymer of polypropylene and ethylene which comprises at least one polar functional group selected from the group of hydroxyl, ether and/or carbonyl.

14. The panel according to any of the previous clauses, wherein at least one balancing core component has a Shore D hardness which is in the range of 3-35% higher than the Shore D hardness of the at least one structural core component.

15. The panel according to any of the previous clauses, wherein the at least one balancing core component, and in particular at least one second polymeric composition comprises at least one polyolefin, in particular an isotactic polyolefin.

16. The panel according to any of the previous clauses, wherein at least one first polymeric composition is substantially the same as the at least one second polymeric composition.

17. The panel according to any of the previous clauses, wherein at least one core layer comprises at least two balancing core components, wherein at least one structural core component is substantially enclosed between at least two balancing core components.

18. The panel according to any of the previous clauses, wherein at least one decorative layer comprises at least one semi crystalline thermoplastic polymer.

19. The panel according to any of the previous clauses, wherein the at least one decorative top layer comprises polypropylene, in particular a polypropylene foil.

20. A process for producing decorative panels, in particular floor, ceiling, building or wall panels, in particular according to any of the previous clauses, comprising the steps of:
   a) extruding at least one mineral filler and at least one first polymer and/or at least one second polymeric composition, such that at least one polymer sheet is formed comprising at least one structural core component and at least one balancing core component;
   b) laminating at least additional layer, in particular at least one decorative top layer to an upper surface of at least one polymer sheet.

21. The process according to clause 20, wherein at least one first polymeric composition and/or at least one second polymeric composition comprises at least one semi-crystalline thermoplastic polymer having a glass transition temperature greater than or equal to −50° C.

22. The process according to clause 20 or 21, wherein after step a) at least one polymer sheet is subjected to a first temperature that is at least 75° C. in particular via at least one first set of calendering rollers that is displaceable in a vertical direction and wherein said polymer sheet is subsequently subjected to a second temperature that is at least 120° C. via at least second set of calendering rollers that is displaceable in a horizontal direction, in particular such that said core layer reaches a degree of crystallinity that allows at least one decorative layer to be laminated to said polymer sheet.

23. The process according to clause 22, wherein before step b), the extruded polymer sheet is subjected to a third temperature in the range of 85° C. to 100° C. for a third time period via at least one third set of calendering rollers and then subsequently subjected to a fourth temperature in the range of 50° C. to 65° C. for a fourth time period via at least one fourth set of calendering rollers.

24. The process according to clause 23, wherein said polymer sheet is subsequently subjected to a fifth temperature in the range of 45° C. to 60° C. via at least one fifth set of calendering rollers and a sixth temperature in the range of 25° C. to 40° C. via at least one sixth set of calendering rollers.

25. The process according to any of clauses 20-24, wherein at least one polymer sheet has a thickness in the range of 1 to 10 mm, preferably 3 to 8 mm, more preferably 4 to 7 mm.

26. The process according to any of clauses 20-25, wherein at least one additional layer, in particular at least one decorative top layer, comprises at least one semi-crystalline thermoplastic polymer, in particular polypropylene, more in particular a polypropylene foil.

27. An extrusion line for the production of decorative floor, ceiling, building or wall panels or building panels in particular according to any of clauses 1 to 19, preferably via a process according to any of clauses 20 to 26, comprising:

at least one extruder configured for single manifold co-extrusion of at least one mineral filler and at least one first polymeric composition in combination with at least one second polymeric composition;

at least one calendering device comprising a plurality of calendering rollers for forming a polymer sheet from a melt obtained from the extruder, wherein at least one roller, and preferably each roller, is configured to be heated;

at least one feeding device for feeding at least one additional layer to the polymer sheet such that said additional layer is laminated to the polymer sheet; and at least one calibration device comprising at least two rollers through which the polymer sheet can be guided.

28. The extrusion line according to clause 27, wherein the extruder comprises a twin-screw extruder, in particular a co-rotating twin screw extruder and/or at least one single screw extruder.

29. The extrusion line according to clause 28, wherein the twin screw has an L/D ratio in the range of 20-30:1.

30. The extrusion line according to clause 28 or 29, wherein the twin screw has a screw profile having at least 40% of flighted area in a feed section thereof and/or at least 25% of flighted area in a transition section and/or meter section thereof.

31. The extrusion line according to any of clauses 27-29, wherein the twin screw has a compression ratio ranging from 2:1 to 4:1, preferably 2.7:1, more preferably 3.3:1.

32. The extrusion line according to any of clauses 27-31, wherein the twin screw has a meter channel depth measuring between 2% and 8%, preferably 2.7% and 7%, more preferably between 3.5% and 6% of the screw diameter.

33. The extrusion line according to any of clauses 27-32, comprising at least one pulling device for pulling the polymer sheet through at least part of the extrusion line.

34. The extrusion line according to any of clauses 27-33, wherein the extruder comprises a least one primary hopper for feeding at least one polymer, in particular polypropylene and at least one secondary hopper for feeding at least one additive.

35. The extrusion line according to any of clauses 27-34, wherein the extruder further comprises a barrel and a die, and at least one gear pump, which gear pump is preferably disposed between said barrel and said die.

36. The extrusion line according to any of clauses 27-35, wherein at least one roller of the calendering device, and preferably each roller, is an oil heated roller.

37. The extrusion line according to any of clauses 27-36, wherein the calendering device comprises at least one embossing roller.

38. The extrusion line according to any of clauses 27-37, wherein the calendering device comprises at least one infrared lamp disposed in between said at least one soft roller and said at least one embossing roller.

39. The extrusion line according to any of clauses 27-38, wherein at least one roller of the calendering device is displaceable in a vertical direction, at least one roller of the calendering device is displaceable in a horizontal direction and/or at least one roller of the calendering device is fixed.

40. The extrusion line according to clause 39, wherein the at least one roller that is fixed is disposed between at least two rollers which are displaceable in a horizontal direction.

41. The extrusion line according to any of clauses 27-40, comprising at least one cutting device for cutting at least part of the polymer sheet, in particular at least one edge of the polymer sheet.

42. The extrusion line according to any of clauses 27-41, comprising at least one cooling device for cooling at least part of the polymer sheet in particular via air cooling.

It will be clear that the invention is not limited to the exemplary embodiments which are illustrated and described here, but that countless variants are possible within the framework of the attached claims, which will be obvious to the person skilled in the art. In this case, it is conceivable for different inventive concepts and/or technical measures of the above-described variant embodiments to be completely or partly combined without departing from the inventive idea described in the attached claims.

The verb 'comprise' and its conjugations as used in this patent document are understood to mean not only 'comprise', but to also include the expressions 'contain', 'substantially contain', 'formed by' and conjugations thereof.

The invention claimed is:

1. A decorative floor, ceiling, building or wall panel, comprising:

at least one core layer; and at least one decorative top layer;

wherein the at least one core layer comprises at least one structural core component and at least one balancing core component, wherein the at least one structural core component comprises at least one mineral filler and at least one first polymeric composition and wherein the at least one balancing core component comprises at least one second polymeric composition, wherein the at least one first polymeric composition and/or the at least one second polymeric composition comprises at least one semi-crystalline thermoplastic polymer, and wherein the at least one balancing core component has a Shore D hardness which is in the range of 3-35% higher than the Shore D hardness of the at least one structural core component.

2. The panel according to claim 1, wherein the at least one core layer is a co-extruded core layer.

3. The panel according to claim 1, wherein the at least one semi-crystalline thermoplastic polymer is a non-halogenic semi-crystalline thermoplastic polymer selected from the group of: polyethylene (PE), polyethylene terephthalate (PET), polybutene-1 (PB-1), polymer environmental resin (PER), polylactic acid (PLA) and/or polypropylene (PP).

4. The panel according to claim 1, wherein the at least one structural core component comprises at least 60% by weight of at least one mineral filler.

5. The panel according to claim 1, wherein the at least one mineral filler of the at least one structural core component is chosen from the group of: limestone, talc, calcium carbonate, magnesium oxide, magnesium chloride, dolomite, magnesium dihydroxide, magnesium dihydrate, aluminium trihydroxide, aluminium trihydrate, and combinations thereof.

6. The panel according to claim 1, wherein the at least one first polymeric composition comprises at least one plastomeric additive.

7. A decorative floor, ceiling building or wall panel, comprising:

at least one core layer; and at least one decorative top layer;

wherein the at least one core layer comprises at least one structural core component and at least one balancing core component, wherein the at least one structural core component comprises at least one mineral filler and at least one first polymeric composition and wherein the at least one balancing core component comprises at least one second polymeric composition, wherein the at least one balancing core component has a Shore D hardness which is in the range of 3-35% higher than the Shore D hardness of the at least one structural core component, wherein the at least one first polymeric composition comprises at least one plastomeric additive, and wherein the at least one plastomeric additive is a copolymer of ethylene and at least one a semi-crystalline thermoplastic polymer.

8. The panel according to claim 7, wherein the at least one plastomeric additive has a density of 0.8 to 1 g/cm3.

9. The panel according to claim 7, wherein the at least one plastomeric additive comprises at least one elastomeric polyolefin comprising isotactic, syndiotactic and/or atactic polyolefin blocks.

10. The panel according to claim 7, wherein the at least one plastomeric additive is manufactured by means of metallocene catalysis and/or a solution process.

11. The panel according to claim 1, wherein the at least one first polymeric composition comprises at least one copolymer of polypropylene and ethylene which comprises at least one polar functional group selected from the group of hydroxyl, ether and/or carbonyl.

12. The panel according to claim 1, wherein the at least one balancing core component has a Shore D of 70 or higher.

13. The panel according to claim 1, wherein the at least one second polymeric composition comprises at least one polyolefin and/or at least one isotactic polyolefin.

14. The panel according to claim 1, wherein the at least one first polymeric composition equals the at least one second polymeric composition.

15. The panel according to claim 1, wherein the at least one core layer comprises at least two balancing core components, wherein the at least one structural core component is enclosed between the at least two balancing core components.

16. The panel according to claim 1, wherein the at least one decorative layer comprises at least one semi crystalline thermoplastic polymer.

17. The panel according to claim 1, wherein the at least one decorative top layer comprises polypropylene.

18. The panel according to claim 7, wherein the at least one plastomeric additive comprises 2-30 wt % of ethylene and/or ethylene units.

19. A decorative floor, ceiling, building or wall panel, comprising:

at least one core layer; and at least one decorative top layer;

wherein the at least one core layer comprises at least one structural core component and at least one balancing core component, wherein the at least one structural core component comprises at least one mineral filler and at least one first polymeric composition and wherein the at least one balancing core component comprises at least one second polymeric composition, wherein the at least one balancing core component has a crystallinity which is in the range of 3-35% higher than the crystallinity of the at least one structural core component.

* * * * *